(12) United States Patent
Hosseini et al.

(10) Patent No.: US 6,481,864 B2
(45) Date of Patent: *Nov. 19, 2002

(54) BACKLIGHT ASSEMBLY WITH A LIGHT PIPE HAVING OPTICAL ELEMENTS AND AN INTEGRAL SURFACE DIFFUSER

(75) Inventors: Abbas Hosseini, Torrance; Hyun-Sun Chung, Fullerton; Anatoly Vasiliev, Torrance; Gajendra D. Savant, Ranch Palos Verdes, all of CA (US)

(73) Assignee: Physical Optics Corporation, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/759,615

(22) Filed: Jan. 12, 2001

(65) Prior Publication Data

US 2001/0001595 A1 May 24, 2001

Related U.S. Application Data

(62) Division of application No. 09/350,198, filed on Jul. 8, 1999.

(51) Int. Cl.[7] ................................................. F21V 7/22
(52) U.S. Cl. ........................ 362/31; 362/551; 362/558; 385/901; 385/146
(58) Field of Search ........................ 362/31, 561, 558, 362/330, 333, 339, 355, 358; 359/599; 385/901, 146; 349/64

(56) References Cited

U.S. PATENT DOCUMENTS

| | | | | | |
|---|---|---|---|---|---|
| 5,473,454 | A | * | 12/1995 | Blanchard | 349/112 |
| 5,485,354 | A | * | 1/1996 | Ciupke et al. | 349/62 |
| 5,890,791 | A | * | 4/1999 | Saito | 362/31 |
| 5,926,033 | A | * | 7/1999 | Saigo et al. | 326/31 |
| 6,151,169 | A | * | 11/2000 | Kim | 349/61 |
| 6,347,873 | B1 | * | 2/2002 | Hosseini et al. | 362/31 |

* cited by examiner

Primary Examiner—Sandra O'Shea
Assistant Examiner—Hargobind S. Sawhney
(74) Attorney, Agent, or Firm—Nilles & Nilles; Leonard Tachner

(57) ABSTRACT

A backlight assembly is disclosed having a light pipe and at least one light source located at an edge of the light pipe. The light pipe has a back surface and a front surface opposite the back surface. The light pipe also has one or more light directing, diffusing, turning, or brightness enhancing film layers adjacent the front surface. The light pipe also has an integral surface diffuser microstructure molded, embossed, or otherwise replicated in the front surface of the light pipe.

28 Claims, 3 Drawing Sheets

BACKLIGHT ASSEMBLY WITH A LIGHT PIPE HAVING OPTICAL ELEMENTS AND AN INTEGRAL SURFACE DIFFUSER

CROSS REFERENCE TO RELATED APPLICATIONS

This application is a divisional of application Ser. No. 09/350,198, filed on Jul. 8, 1999.

BACKGROUND OF THE INVENTION

1. Field of the Invention

The present invention is directed generally to backlight assemblies for liquid crystal displays and the like, and more particularly to a backlight assembly having a light pipe with an integral diffuser surface structure formed on a top or exit surface of the light pipe.

2. Description of the Related Art

Many backlight assemblies for illuminating displays, such as a liquid crystal display panel for a laptop computer, include a light pipe that internally reflects light via what is known as total internal reflection or TIR. When the light within the light pipe is incident on a front or exit surface at the proper angle, the light exits the front or exit surface. The light then typically passes through one or more layers of additional light diffusing, directing, and/or turning films before entering and illuminating the display. The light pipe typically includes a back or reflective surface that reflects light upward until the light eventually exits the light pipe through the front surface. A reflective layer is sometimes disposed adjacent the back surface of the light pipe to reflect light back into the light pipe that has exited through the back surface. The back surface of the light pipe often includes a number of structures or elements thereon that aid in reflecting light upward toward the front surface and in changing the angle of light reflected thereby.

FIG. 1 illustrates one type of prior art backlight assembly and display 20. The assembly 20 has a pair of light sources 21 located along opposite edges of a light pipe 22 with a plurality of silk screen dots 24 disposed on a back surface 26. These dots 24 are typically white or light colored so as to scatter and reflect light upward from the back surface 26 toward a front surface 28 of the light pipe 22. A reflective surface 30 is disposed adjacent the back surface 26 to reflect light back into the light pipe 22 that escapes through the back surface. The density and size of the dots 24 are manipulated in order to control the amount of light reflected from a particular area or region of the back surface 26 of the light pipe 22. Control of the dot density and size therefore is utilized to produce desired illumination or brightness characteristics for light exiting the front surface 28 of the light pipe 22.

The backlight assembly 20 also includes a separate diffuser film layer 32 disposed adjacent the front surface 28 of the light pipe 22. The diffuser film can vary but in one known embodiment, the diffuser is a 60° circular diffuser. A pair of brightness enhancing film or BEF™ layers 34 are disposed over the separate diffuser film layer 32 and arranged orthogonal to one another. These film layers are available from 3M Corp. of St. Paul, Minn. and the term BEF™ is a TRADEMARK of 3M. Each BEF™ layer typically has a plurality of optical elements such as prisms 35 on a front or top surface 36 facing away from the light pipe. Each BEF™ layer 34 collimates light in one direction or axis so that all light exiting the light pipe 22 and the separate diffuser film layer 32 is collimated and redirected to near the normal direction of the backlight assembly by one of the BEF™ layers.

An LCD panel 38, shown in phantom view in FIG. 1, is typically added to the backlight assembly over the second brightness enhancing film layer 34. The LCD panel 38 reduces the brightness of the overall backlight assembly by a factor of 10 after the light emitted by the backlight passes through the LCD panel.

The separate diffuser film 32 has a smooth back, surface 40 facing toward the light pipe 22 and a diffuser surface structure on a front surface 42 facing away from the light pipe. When placed against the smooth front surface 28 of the light pipe 22, very little or no air gap is present between the light pipe front surface 28 and the diffuser film back surface 40.

FIG. 2 illustrates a graphic representation of the light output or brightness of the various components, as they are stacked together, for the silk screen dot light pipe and backlight assembly of FIG. 1. The graph represents brightness at virtually any point on the surface area of the components. The brightness value at any given point will vary when compared to other points on the surface area of the components, with the brightest area or region being close to the center of the backlight assembly. The brightness curve of this graph is not limited to only a vertical or horizontal axis measurement.

The LP curve shows the comparative brightness for light exiting only the light pipe for any given point over a range of angles from the normal to +/−90° relative to the normal. The brightness is somewhat evenly distributed over the entire range of angles because of the reflecting and scattering characteristics of the dots. The DF1 curve shows the brightness over the range of angles, for the given point, of light passing through both the light pipe and the separate diffuser film. The diffuser film evens out the light dispersion but at the same time directs more light toward the normal. The BEF™ curve shows the brightness over the same range of angles, for a given point, of light passing through the light pipe, the first diffuser layer, and the first BEF™ layer. The first brightness enhancing film layer collimates light in only one direction or plane such as along the vertical axis of the display. The second BEF™ layer further enhances the brightness of the backlight assembly by further collimating light in a direction orthogonal to the direction of the first BEF™ layer. This final brightness output is identified in FIG. 2 by the BEF™ 2 curve and shows that a substantial portion of light emitted by the backlight assembly is normal to the front surface.

One problem with the silk screen dot light pipe and backlight assembly is that the brightness or luminance of light exiting the backlight assembly is not particularly high. The efficiency of the light pipe is merely adequate in directing light out of the front surface. This is because much light is scattered by the dots so that the light has Lambertian qualities and thus exits the light pipe as scattered. Also, the diffuser film is placed against the front, smooth surface of the light pipe leaving little or no air between the two surfaces. Much of the light incident on the front surface is at a relatively high angle, nearly parallel to the front surface. Because the light pipe and the diffuser film have very similar indexes of refraction, the light exits the light pipe at the same high angles. This light is either not directed to the display at all, or is not collimated sufficiently toward the normal. This light is therefore directed away from a desired viewing area normal to the surface and thus does not enhance the display brightness where needed.

FIG. 3 illustrates the other above-described prior art backlight assembly 50. The backlight assembly 50 has a light tapered wedge TIR light pipe 52 and at least one light source 54 disposed along one edge. A plurality of grooves 56 are formed parallel to one another and parallel to the light source along a back surface 58 of the light pipe. The backlight assembly 50 also includes a reflective surface 60 adjacent the back surface 58 of the light pipe that is similar to the surface 30 described above. The light pipe also has a front surface 62 opposite the back surface. A directional turning film or DTF™ 64 is disposed adjacent the light pipe front surface 62. The term DTF™ is a TRADEMARK of the assignee of the present invention and DTF™ products are sold by the assignee of the present invention, Physical Optics Corp. of Torrance, Calif. The DTF™ 64 has a plurality of optical elements 66 such as prism structures on a back surface 68 that faces toward the light pipe. The DTF™ has a surface diffuser structure formed on a front surface or exit surface 70 of the DTF™.

FIG. 3 shows exemplary light rays L traveling through and out of the backlight assembly. As shown schematically in FIG. 3, the grooves and hence the light pipe are designed, for example, to emit light at approximately 42° and relative to the normal of the front surface or exit surface of the light pipe. The DTF™ layer 64 is designed with its prism structures to accept light entering at 42° and to redirect the light more toward the normal of the diffuser and the backlight assembly. The top diffuser layer is typically designed to slightly even out the light distribution. In one example, the top diffuser layer is intended to provide a circular light output for any given point thereon having a very small conical shape in the range of 0.5° to about 5°. Thus, the diffuser helps to more evenly distribute light and yet keep the light fairly collimated and near the normal direction to the diffuser surface. The optical elements 66 further redirect the light toward their normal.

FIG. 4 illustrates the light exiting the light pipe 52 at a 42° angle. FIG. 5 illustrates a graphic representation of the brightness or light output from the light pipe shown in FIGS. 3 and 4. FIG. 5 shows the brightness output separately for the vertical axis at any horizontal point on the light pipe and for the horizontal axis at any vertical point on the light pipe. The vertical brightness component at any given point is centered at about 42°, which tends to maximize brightness for the viewer. The horizontal brightness component is fairly evenly distributed over the range of angles at any given vertical point.

The light pipe's grooved construction is used in conventional backlight assemblies for reflecting light upward from the back surface of the light pipe at a particular angle so that the light exits the front surface at a predetermined angle. The grooves can be provided having different line density, line spacing, and/or surface angles so that the light exiting the top surface of the light pipe is controlled as desired. The backlight assembly with the grooved light pipe back surface is used for displays where the screen is intended to be visible from a fairly limited range of angles or directions. For example, some laptop computer screens are very bright and visible from certain viewing angles and are difficult or impossible to see upon rotating the screen by only a few degrees.

A known problem in this type of backlight assembly is a diagonal line or shadow effect. A diagonal shadow or line is often produced that starts in the upper corners of the display screen and extends diagonally downward from each corner. Apparently, the combined effects of the sharp corners, the ends of the light source, and the groove edges near the corners of the light pipe cause dead spots in light projected into the light pipe. Diagonal line effects are reduced by addition of the DTF™ layer:and the LCD panel to the backlight assembly, and while these additional layers also reduce the brightness of the display output, they do not eliminate the diagonal line or shadow.

There have been a number of methods and light pipe constructions designed to reduce diagonal line effects. One such method, described in U.S. patent application Ser. No. 09/137,549 to Savant, et al. and assigned to the assignee of the present invention, teaches extending the light source beyond the edges of the light pipe. This method also teaches extending the edge length of the light pipe adjacent the light source to match the light source length to reduce the dead spots caused by the light pipe sharp corners and the light source ends. This method merely reduces, but does not eliminate diagonal lines or shadows in the light output. Another such method, described in U.S. patent application Ser. No. 09/223,987 to Laine, and assigned to the assignee of the present invention, teaches turning the groove faces 180 degrees on the back surface of the light pipe. Light entering the light pipe is then totally internally reflected to the far end of the light pipe and then reflected back toward the light source. Only then do the grooves reflect the light upward to the front or exit surface. This method also reduces but does not eliminate the diagonal line problem.

SUMMARY OF THE INVENTION

The present invention provides an improved light pipe construction and improved backlight assemblies that substitute for those described above. The backlight assemblies of the invention each include a light pipe with a diffuser surface structure integrally formed in the front surface of the light pipe. Depending on the diffuser surface structure light output characteristics, the diffuser significantly enhances the brightness of the backlight assembly output without eliminating the benefits of each type of backlight assembly.

One object of the present invention is to provide: a backlight assembly constructed in essentially the same manner as a conventional backlight assembly but with improved brightness characteristics. A further object of the present invention is to provide a backlight assembly with enhanced brightness and yet with very little or no decrease in other performance characteristics. Another object of the present invention is to provide a backlight assembly that eliminates the diagonal line or shadow in the assembly output without detracting from the brightness and light directing characteristics of the backlight. A further object of the present invention is to provide a backlight assembly that requires no additional, different, or separate components when compared to the conventional backlight assembly constructions. Therefore, manufacturing, assembly and installation processes for the backlights and displays need not be changed to accommodate the backlight assembly of the invention.

To accomplish these and other objects, features and advantages of the invention, one embodiment of a backlight assembly is provided having a TIR light pipe with a light source disposed adjacent at least one edge. The light pipe has a back surface that reflects light and a front surface opposite the back surface through which light exits the light pipe. The light pipe defines a horizontal axis and a vertical axis, both generally parallel to the front surface of the light pipe and orthogonal to one another. The back surface of the light pipe includes a plurality of optical elements carried thereon. The light pipe of the invention has a surface diffuser microstructure formed integrally in the front surface.

In one embodiment, the optical elements on the back surface of the light pipe are a plurality of silk screen dots applied thereto. In another embodiment, the optical elements on the back surface of the light pipe are a plurality of grooves formed therein.

In one embodiment, the light pipe of the invention is incorporated into a backlight assembly for illuminating a display such as an LCD screen.

In one embodiment having silk screen dots on the back surface of the light pipe, a backlight assembly having a light diffusing film layer is placed adjacent the front surface of the light pipe. A pair of BEF™ layers are stacked adjacent the front surface of the light pipe and oriented 90° relative to one another so that light exiting the light pipe is collimated in both the horizontal axis and vertical axis towards the normal to the front surface of the light pipe.

In one embodiment, the integral surface diffuser, microstructure is embossed on the front surface. In another embodiment, the diffuser microstructure is molded onto the front surface of the light pipe when the light pipe is injection molded. In yet another embodiment, a diffuser microstructure is replicated in an epoxy layer ion the front surface of the light pipe so as to be affixed permanently to the light pipe.

In one embodiment, the diffuser microstructure is designed to produce generally circular light output patterns wherein each surface structure produces a cone of light output. In one embodiment, the cone of light is normal to the front surface of the light pipe and has an angle of between about 0.1° to about 20°. In one preferred embodiment, the range of angles is between about 0.5 and 10°.

In one embodiment, the diffuser microstructure is designed to produce generally elliptical light output patterns wherein each surface structure produces an ellipse shaped light output from a beam of light. In one embodiment, the ellipse is oriented so that the long component of the ellipse is arranged parallel to the light, sources. In one preferred embodiment, the ellipse shaped pattern is about 90° for the long component and 1° in the short component.

In another embodiment having the grooves on the back surface, a backlight assembly also has a DTF™ layer with a plurality of optical elements disposed adjacent the front surface of the light pipe. The DTF™ layer receives the collimated light exiting the light pipe and redirects the collimated light in a desired direction. According to the invention, the front surface of the light pipe includes the surface diffuser microstructure formed integrally therein that produces a light output pattern with an elliptical shape. The long component of the ellipse is arranged generally parallel to the light sources. and to the DTF™ optical elements.

In one embodiment, the long component has an angle ranging between about 30° and about 100°. In one embodiment, the short component has an angle ranging between about 0.2° and about 10°.

In each of these embodiments, the integral surface diffuser on the light pipe enhances the brightness of the backlight assembly. In the grooved back surface embodiment, the integral surface diffuser also completely eliminates the diagonal line problem.

These and other objects, features and advantages of the present invention will become apparent and better understood when considered in conjunction with the following detailed description and accompanying drawings. It should be understood, however, that while indicating preferred embodiments of the present invention, the following description is given only by way of illustration and not of limitation. Many, changes and modifications can be made without departing from the scope and spirit of the invention and the invention includes all such modifications.

BRIEF DESCRIPTION OF THE DRAWINGS

A clear conception of the advantages and features of the present invention will become apparent upon referring to the drawings in which.

DETAILED DESCRIPTION OF THE PREFERRED EMBODIMENTS

The invention generally provides a light pipe for backlight assemblies that are a significant improvement over the prior art backlight assemblies shown in FIGS. 1–5 and described above. The light pipe of the invention includes an integral surface diffuser microstructure on the front or exit surface. This front surface in prior art constructions is left smooth or flat. The addition of the integral surface diffuser microstructure unexpectedly and significantly improves the uniformity of light distribution over the entire surface area of the backlight assembly as well as increases the brightness or light output of the assembly. The invention also eliminates the diagonal line problem associated with some prior art backlight assemblies.

Figure 1:
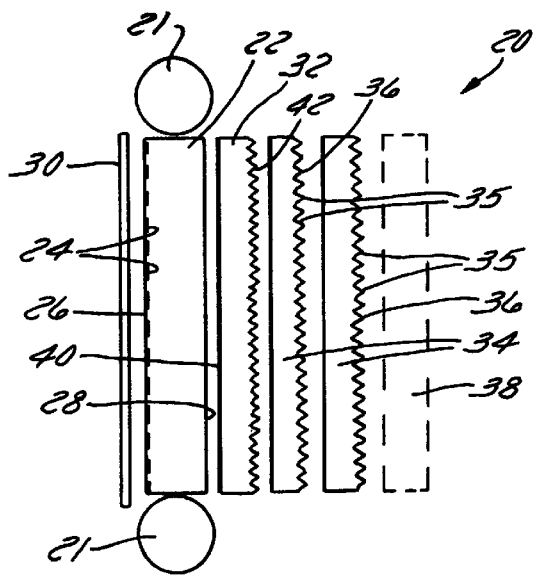
FIG. 1 illustrates a cross-section schematic view of a prior art backlight assembly wherein the light pipe has a plurality of silk screen dots on a back surface.
Figure 2:
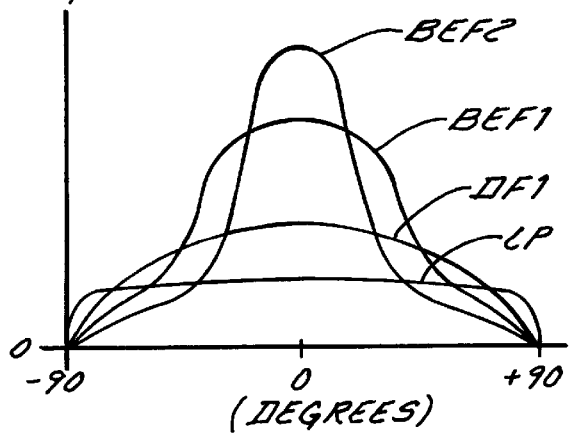
FIG. 2 illustrates a graphic representation of the light output or brightness for the various component combinations of the backlight assembly of FIG. 1.
Figure 6:
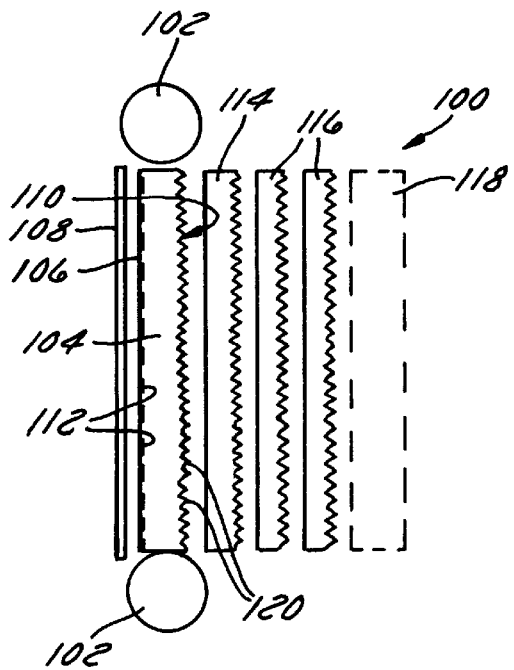
FIG. 6 illustrates a cross-section schematic view of one embodiment of a backlight assembly constructed in accordance with the present invention.

Referring to FIG. 6, a backlight assembly 100 having a construction similar to that of the backlight assembly 20 of FIG. 1 is shown. The backlight assembly 100 has a pair of light sources 102 disposed adjacent opposite edges of a light pipe 104. It is certainly within the scope of the invention to use only one light source for this embodiment but two sources are commonly used to provide better illumination over the surface area of a display. The light pipe 104 has a back surface 106, an adjacent reflective surface 108, and an opposite front surface 110. The back surface 106 has a plurality of silk screen dots 112 thereon. The remaining components of the backlight assembly 100 are identical to the backlight assembly and include a diffuser film layer 114, a pair of BEF™ layers 116, and an LCD panel 118 shown in phantom view.

The novel feature of the present invention pertains to the front surface 110 of the light pipe 104. An integral surface diffuser microstructure 120 is formed in the light pipe material. The diffuser structure can be formed or replicated in any number of ways in the light pipe material. For example, the surface microstructure can be hard-embossed in the front surface of the light pipe. A master diffuser surface is first recorded and replicated in a metallic shim. The shim can be used to emboss the microstructure in the surface of the light pipe. The surface microstructure also can be molded directly into the light pipe surface by injection molding the light pipe and using the shim as a separate part of the mold. Alternatively, the mold itself can be made having the surface structure formed in one surface of the mold cavity. Finally, the surface microstructure can be soft-embossed on the light pipe by spreading a layer of epoxy on the light pipe and then pressing against that layer a sheet having a master of the microstructure therein. These methods are fully described in U.S. Pat. Nos. 5,584,386 and 5,609,939, both assigned to the assignee of the present application, and in pending U.S. patent application Ser. No. 08/800,872 to Savant et al. and 09/052,586 to Savant et al., both also assigned to the assignee of the present invention.

The surface diffuser structure of the backlight 120 accomplishes two goals to improve and enhance the overall brightness of the backlight assembly construction. First, the diffuser, depending on the selected and designed diffusing capabilities, helps to reduce the Lambertian spreading of light upon exiting the light pipe caused by the silk screen dots. The integral diffuser directs more light toward the normal.

Second, because the surface is somewhat rough, and irregular, it creates an air gap between the diffuser film layer 114 and the front surface 110 of the light pipe. Air has a significantly different index of refraction than typical light pipe materials such as polycarbonates (on the order of 1.0 compared to 1.5). The light incident on the front surface at sharp angles relative to normal from within the light pipe is reflected back into the light pipe instead of exiting the light pipe at such sharp angles. The light does not exit the light pipe until it is more toward the normal. Thus, more light is reflected more toward the normal upon entering the diffuser film layer. These two effects significantly increase brightness of the backlight assembly.

A number of examples have been produced to verify the effectiveness of the invention. The diffuser surface can be formed to produce virtually any light output shape or contour. However, for the silk screen dot backlight assembly where Lambertian light dispersion reduces the overall brightness of the display, a circular diffuser output pattern is desirable because light is directed more toward the normal in both the horizontal and vertical directions. In one embodiment, a circular diffuser angle on the order of between about 0.1° to about 20° is effective for increasing brightness as compared to the backlight assembly of FIG. 1. A more preferred circular diffuser range is on the order of between about 0.5° and about 10°.

An elliptical diffuser also accomplishes the goal of brightness enhancement. In one embodiment, a 90° by 1° elliptical diffuser is preferred and produces the desired results. The long component of the ellipse can vary between about 80° and 120° and the short component can vary between about 0.2° and about 45 degrees. When an elliptical diffuser is used, the long component is preferably oriented parallel to the light source or sources so as not to direct too much light away from a viewer sitting in front of the backlight assembly.

Figure 7:
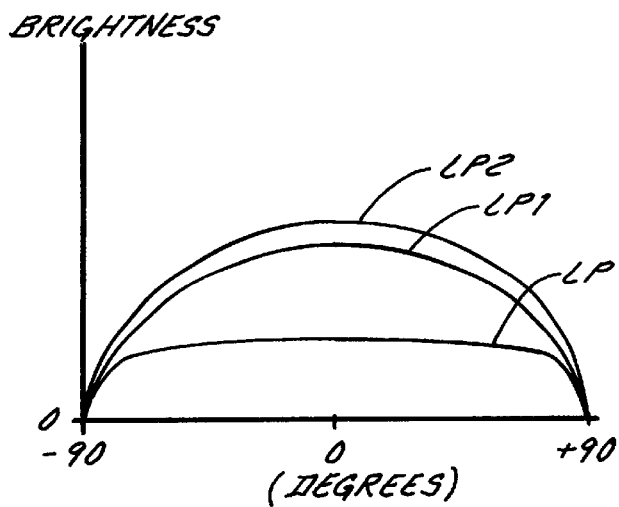
FIG. 7 illustrates a graphic representation of the light output or brightness for the various component combinations of the backlight assembly of FIG. 6.

FIG. 7 graphically illustrates brightness as compared to the range of angles for any given point on the light pipe and without regard to the horizontal or vertical direction. The LP curve represents light output brightness from only the light pipe 104 without either the integral diffuser 120 or the diffuser film 114. The LP1 curve indicates brightness for the light pipe 104 with only the diffuser film 114. The LP2 curve represents brightness for the light pipe 104, the diffuser film 114 and the integral diffuser 120. The integral diffuser represented by this figure is a circular pattern diffuser. Surprisingly, a minimum increase in brightness of about 5 percent is achieved utilizing the novel integral surface diffuser 120. This was unexpected in that brightness is increased even though diffuser film 114 was previously used as a separate component.

In this embodiment, the diffuser angle should not be too large in the vertical direction. Otherwise, the light will not be emitted concentrated toward the normal direction, thereby reducing the brightness enhancement benefit. The angle in the horizontal direction need not be as small. This is because wide horizontal dispersion of light across the backlight assembly increases the uniformity of light over the viewing area. However, the angle should not be too large so as to direct much of the light tangent to the exit surface of the backlight assembly.

Figure 3:
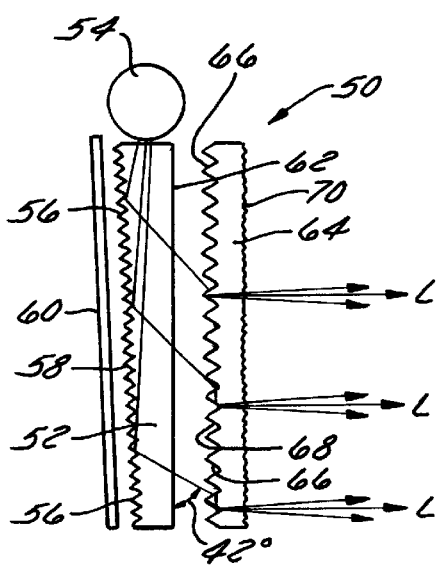
FIG. 3 illustrates a cross-section schematic view of another prior art backlight assembly wherein the light pipe has a plurality of grooves on the back surface.
Figure 4:
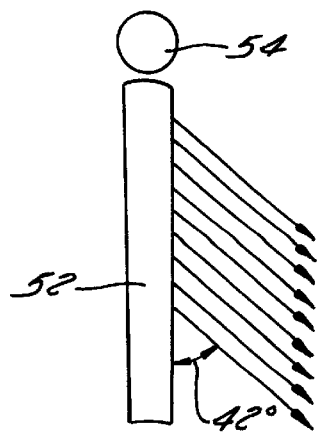
FIG. 4 illustrates a cross-section schematic view of the light pipe for the backlight assembly of FIG. 3 and showing the collimated light output.
Figure 5:
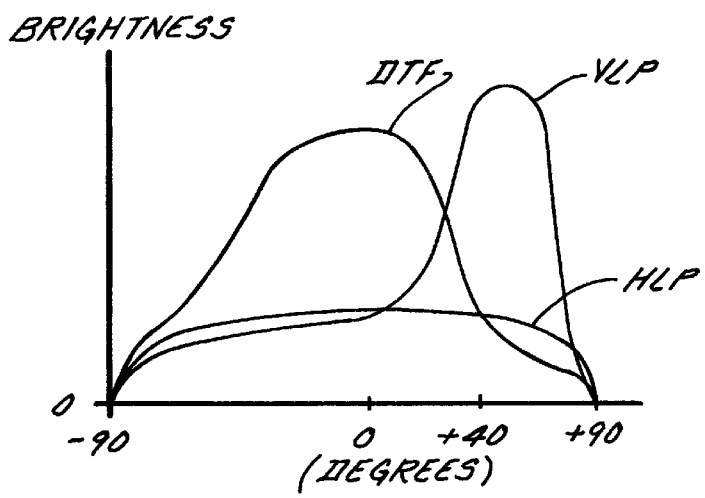
FIG. 5 illustrates a graphic representation of the light output or brightness for the various component combinations of the backlight assembly of FIG. 2.
Figure 8:
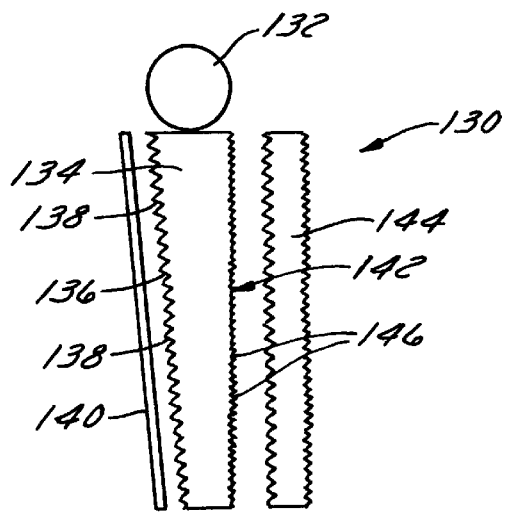
FIG. 8 illustrates a cross-section schematic view of another embodiment of a backlight assembly constructed in accordance with the present invention.

FIG. 8 illustrates another backlight assembly 130 of the invention that is similar to the backlight assembly 50 shown in FIG. 3. The backlight assembly 130 has a light source 132 disposed along one edge of a tapered wedge light pipe 134. The light pipe has a back surface 136 with a plurality of grooves 138 thereon. A reflective surface 140 is located adjacent the back surface 136. This reflective surface can be in the form of a metallized surface applied directly to the grooves in the back surface. The light pipe also has a front surface 142 opposite the back surface. A DTF™ layer 144 is disposed adjacent the front surface and is identical to the DTF™ 64 of the backlight assembly 50.

Figure 10:
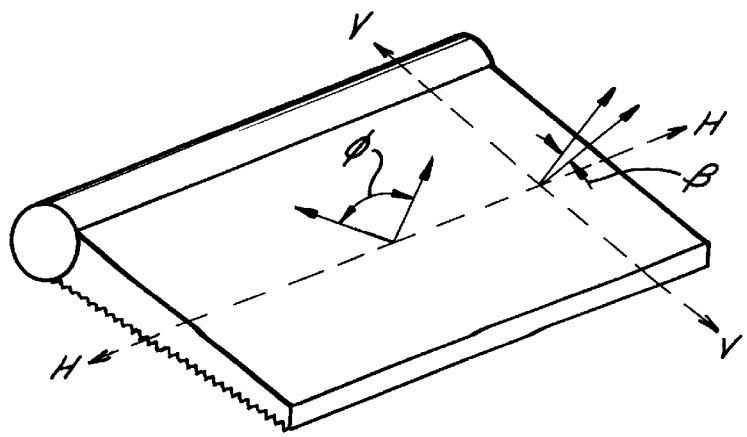
FIG. 10 illustrates a schematic elevation of the light output shape distribution in the vertical axis and horizontal axis for the light output shown in FIG. 10.

The light pipe 134 has a surface diffuser microstructure 146 formed therein in a manner identical to that for the surface 120 described above for the light pipe 104. However, in this embodiment, an elliptical diffuser structure is preferred. An elliptical diffuser structure produces an ellipse-shaped light output from a beam of light. FIG. 10 illustrates an exaggerated schematic representation of an elliptical output 150 from a point of light. FIG. 10 illustrates the vertical component or angle β of the elliptical output and the horizontal component or angle Ø of the output.

Figure 9:
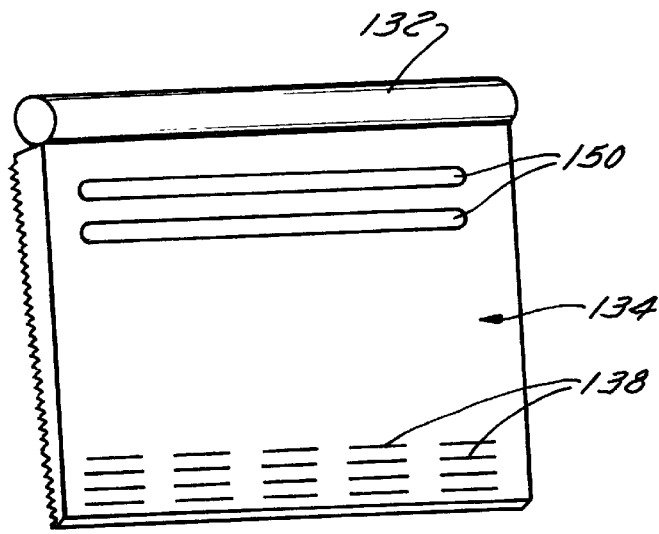
FIG. 9 illustrates a schematic front view of one embodiment of the controlled light output shape and orientation for the light pipe of the backlight assembly of FIG. 8.

For example, two samples were fabricated wherein the diffuser microstructure produced a 90° by 1° ellipse and produced a 40° by 0.2° ellipse. It has been determined that the diffuser structure must be arranged on the surface of the light pipe so that the long component of the ellipse is oriented horizontally and parallel to the grooves 138, as shown schematically in FIG. 9. The short component of the ellipse is oriented vertically. Thus, light exiting the light pipe is spread substantially in the horizontal direction, evening out the light distribution.

In the 90° by 1° example, light is only minimally spread in the vertical direction by the 1° angle of the elliptical output. The vertical component therefore has very little effect on the light directing properties of the grooves in the light pipe and the prisms of the DTF™. The light is therefore substantially directed toward the desired vertical direction, such as the 42° described above. However, the light is very evenly distributed across the backlight assembly in the horizontal direction by the 90° component of the ellipse.

This type of diffusion completely eliminates the diagonal line or shadow from the output without affecting the overall brightness and directional control of the light pipe. What is unexpected about this is that the diagonal line is eliminated by the combination of the diffuser integral with the light pipe and the separate diffuser film 114 but was not completely eliminated by the separate diffuser film 114 alone. Additionally, even if a second separate diffuser film were added, the diagonal line problem is eliminated, but the brightness of the light output is significantly reduced. The integral diffuser eliminates the diagonal line and enhances the overall brightness of the output.

The range of ellipse angles can vary considerably without departing from the scope of the invention. However, the short component of the ellipse should be in a range of between about 0.2° and about 10°, and preferably between about, 0.5° and about 5°. The long component of the ellipse should be in a range of between about 40° and about 120°, and preferably between about 80° and about 100°.

A circular diffuser can be used, but tests have shown that a diffuser angle of more than about 15° significantly reduces brightness of the backlight assembly. This is because collimation effects are significantly reduced by the wide-angle dispersion caused by the diffuser. A smaller angle, such as about a 7° circular diffuser has limited effect on brightness and significantly reduces the appearance of diagonal lines or shadows, but does not completely eliminate the diagonal line problem. Use of an elliptical diffuser therefore is preferred but not absolutely necessary.

Though the invention is described referring to particular embodiments, many changes and modifications may be made to the invention as described without departing from the spirit and scope thereof. The scope and spirit of these changes and modifications will become apparent from the appended claims. The scope of the invention is therefore intended only to be limited by the appended claims.

What is claimed is:

1. A light pipe for a backlight assembly, the light pipe comprising:
   a front surface;
   a back surface opposite the front surface;
   a plurality of optical elements formed in the back surface; and
   an integral surface diffuser formed in the front surface.

2. The light pipe according to claim 1, wherein the plurality of optical elements formed in the back surface of the light pipe further comprise a plurality of grooves formed in the back surface.

3. The light pipe according to claim 2, wherein the plurality of grooves have a spacing between the grooves that varies over at least a portion of the back surface of the light pipe.

4. The light pipe according to claim 1, wherein the integral surface diffuser produces generally circular light output patterns each in the form of a light output cone.

5. The light pipe according to claim 4, wherein the cones of light output are each relatively normal to the front surface of the light pipe and have a cone angle of between about 0.1° to about 20°.

6. The light pipe according to claim 5, wherein the cone angle of the cones of light output are in a range of between about 0.5° and about 10°.

7. The light pipe according to claim 1, wherein the integral surface diffuser produces generally elliptical light output patterns, each having a generally ellipse shaped patterns of light.

8. A backlight assembly for a display, the backlight assembly comprising:
   a total internal reflection light pipe having a front surface, a back surface opposite the front surface, and at least one edge;
   at least one light source located adjacent the at least one edge;
   a plurality of optical elements formed in the back surface of the light pipe; and
   an integral surface diffuser formed in the front surface of the light pipe.

9. The light back assembly according to claim 8, wherein the plurality of optical elements on the back surface of the light pipe further comprise a plurality of grooves formed in the back surface.

10. The backlight assembly according to claim 9, further comprising:
    a directional turning film having a plurality of optical elements disposed adjacent the front surface of the light pipe so that the directional turning film layer receives collimated light exiting the light pipe and redirects the collimated light in a desired direction.

11. The backlight assembly according to claim 10, wherein the integral surface diffuser produces generally elliptical shaped light output patterns, each having a generally ellipse shaped pattern of light.

12. The backlight assembly according to claim 11, wherein the ellipse shaped patterns each have a long component having an angle ranging between about 30° and about 100°, and a short component having an angle ranging between about 0.2° and about 10°.

13. The backlight assembly according to claim 8, further comprising:
    light diffusing film layer disposed adjacent the front surface of the light pipe.

14. The backlight assembly according to claim 8, further comprising:
    a pair of brightness enhancing film layers stacked on top of one another adjacent the front surface of the light pipe, wherein each of the brightness enhancing film layers is oriented parallel one another but rotated 90° relative to one another so that light exiting the light pipe is collimated in all directions toward a normal relative to the front surface of the light pipe.

15. The back light assembly according to claim 8, wherein the integral surface diffuser produces generally elliptical light output patterns each in the form of an ellipse shaped pattern of light.

16. The backlight assembly according to claim 15, wherein the ellipse shaped patterns are oriented so that a long component of the ellipse shaped patterns is arranged generally parallel to the light source.

17. The backlight assembly according to claim 15, wherein the ellipse shaped patterns each have a long component having an angle of about 90° and a short component having an angle of about 1°.

18. The backlight assembly according to claim 8, wherein the integral surface diffuser produces generally circular light output patterns wherein each light output pattern has a generally cone shaped light output.

19. A method of increasing brightness of a backlight assembly, the method comprising the steps of:
    providing a light pipe with a front surface, a back surface, and at least one edge;
    forming an integral surface diffuser directly in the front surface of the light pipe;

forming a plurality of optical elements in the back surface of the light pipe;

placing a light source adjacent the at least one edge of the light pipe; and placing the light pipe adjacent a display of the backlight assembly and illuminating the light source.

20. The method according to claim 19, further comprising the step of:

placing a light diffusing film layer adjacent, the front surface of the light pipe creating an air gap between the integral surface diffuser and a smooth back surface of the light diffusing film layer.

21. The method according to claim 20, further comprising the step of:

placing a pair of brightness enhancing film layers stacked on top of one another adjacent the front surface of the light pipe and over the light diffusing film layer, wherein the brightness enhancing film layers are oriented essentially parallel to one another and rotated 90° relative to one another so that light exiting the light pipe is collimated in all directions toward a normal relative to the front surface of the light pipe.

22. The method according to claim 19, wherein the step of forming an integral surface diffuser further comprises:

embossing a micro-structure on the front surface of the light pipe after the light pipe is formed thereby defining the integral surface diffuser.

23. The method according to claim 19, wherein the step of forming an integral surface diffuser further comprises:

molding a micro-structure into the front surface of the light pipe when the light pipe is molded thereby forming the integral surface diffuser in the light pipe.

24. The method according to claim 19, wherein the step of forming the integral surface diffuser further comprises:

spreading an epoxy layer on the front surface of the light pipe, replicating a micro-structure in the epoxy layer, and curing the epoxy layer on the front surface of the light pipe thereby forming the integral surface diffuser.

25. A method of eliminating diagonal lines from a backlight assembly, the method comprising the steps of:

providing a light pipe having a front surface, a back surface, and at least one edge;

forming a plurality of grooves in the back surface of the light pipe;

forming an integral surface diffuser directly in the front surface of the light pipe;

placing at least one light source adjacent the at least one edge of the light pipe; and placing the front surface of the light pipe adjacent a display of the backlight assembly and illuminating the light source.

26. The method according to claim 25, further, comprising the step of:

providing a directional turning film layer having a plurality of optical elements formed on one side of the layer and a smooth surface on an opposite side of the layer; and placing the directional turning film layer adjacent the front surface of the light pipe so that the smooth surface of the layer faces the integral surface diffuser of the light pipe thereby creating an air gap between the directional turning film layer and the light pipe.

27. A method of creating an air gap between a light pipe and a display of a backlight assembly, the method comprising the steps of:

forming an integral surface diffuser micro-structure on a front surface of the light pipe;

providing a separate light diffusing film layer having at least one smooth side; and placing the smooth side of light diffusing film layer adjacent the front surface of the light pipe thereby creating an air gap between the micro-structure of the integral surface diffuser and the smooth side of the light diffusing film layer.

28. A method of forming an air gap between a, light pipe and a display of a backlight assembly, the method comprising the steps of:

forming an integral surface diffuser micro-structure in a front surface of the light pipe;

providing a directional turning film having a plurality of optical elements on one side of the film layer and a smooth surface on an opposite side of the film layer; and placing the smooth surface of the directional turning film layer adjacent the micro-structure of the integral surface diffuser of the light pipe.

* * * * *